UNITED STATES PATENT OFFICE 2,315,141

PROCESS AND COMPOSITION FOR THE PREPARATION OF REFLECTING SURFACES

Philip F. Tryon, Terre Haute, Ind., assignor to Commercial Solvents Corporation, Terre Haute, Ind., a corporation of Maryland No Drawing. Application April 9, 1942, Serial No. 438,307

8 Claims. (Cl. 117—35)

The present invention relates to a novel process for obtaining mirrored surfaces and to suitable compositions for producing the same. More particularly, it relates to the use of nitro alcohols as active ingredients in mirror-forming compositions, said nitro alcohols having the following structural formula:

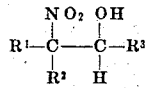

in which the substituents $R^1$ and $R^2$ may represent either hydroxyalkyl, hydrogen, or an alkyl group, and $R^3$ represents either hydrogen, aryl, or alkyl.

The production of mirrors, such as those of the silver type, has in the past been achieved by the use of a composition containing a compound of silver in a readily-reducible form. Silvering compositions typical of those previously employed were prepared by dissolving a suitable silver salt such as silver nitrate in water, and adding thereto a solution of potassium or sodium hydroxide until precipitation of silver oxide appeared to be complete. To this mixture was then introduced aqueous ammonia until all of the silver oxide had completely dissolved, and the object to be coated with silver then placed in this solution, after which a material containing a reactive aldehyde group such as glucose, was added. Although within certain relatively narrow limits such compositions are capable of giving satisfactory reflecting surfaces, they have not met with unqualified success. For example, when employing such silvering compositions it was necessary to always use a freshly-prepared ammoniacal silver solution since if such solutions were permitted to stand for any period of time silver fulminate, a highly explosive material, was formed. Furthermore, it was generally necessary to carry out the silvering process at relatively low temperatures in order to prevent the formation of such explosive substances. Also, the alkalinity of these compositions was a factor to be closely controlled inasmuch as excessive quantities of alkali resulted in the deposition of dark and irregular silver films.

I have now discovered certain novel compositions and a method for applying the same, the utilization of which results in the production of highly satisfactory reflecting surfaces, without encountering the disadvantages characteristic of the methods formerly employed. In carrying out my invention, bright silver mirrors may be obtained by adding a solution of a suitable base to a solution containing a nitro alcohol, of the type mentioned above, and a silver ammonia complex. The basic solution is preferably added with agitation at temperatures of from about 20–80° C., to the solution containing the nitro alcohol and the silver ammonia complex, the latter solution being in contact with the object upon which the reflecting surface is to be produced. In this connection, the expression "silver ammonia complex," which appears in the disclosure as well as in certain of the appended claims, is to be interpreted to include, in addition to the complex formed from ammonia and a silver salt, the complexes resulting from silver salts and an alkyl-substituted ammonia, such as for example 2-aminobutane, trimethylamine, diethylamine, N-(2-aminoisobutyl)isopropylamine, and the like.

Although in general the best results are obtained by employing approximately equivalent quantities of reactants at temperatures of from 20–80° C., it will be found that these conditions may be varied within relatively wide limits. The principal factors ordinarily responsible for necessitating changes in proportions of reactants and reaction conditions are the nature of the surface to be coated, the desired rate of deposition of silver, and the desired degree of brightness of the mirror to be produced.

Any of the silver salts that are capable of forming a complex with ammonia or the above-mentioned amines under the reaction conditions employed, may be utilized. Examples of such silver compounds are the nitrate, sulfate, acetate, chlorate, oxide, cyanide, fluoride, chloride, and silver potassium cyanide.

The base utilized in preparing silvering compositions of the type contemplated by the present invention may be any of a number of materials having an alkaline reaction. As examples of such compounds there may be mentioned the water soluble hydroxides, carbonates, and bicarbonates of the alkali and alkaline earth metals. Also, ammonia and the alkyl-substituted ammonias, or amines, such as, 2-aminobutane, trimethylamine, diethylamine, N-(2-aminoisobutyl)isopropylamine, etc., may be employed in lieu of basic materials of the above-mentioned type, and it is to be specifically understood that the term "base," used in certain of the claims, includes such compounds. When employing alkaline substances of the latter class I have found that the time required for deposition of the silver is somewhat longer than that necessary when using stronger bases, such as for example, sodium hydroxide. However, the mirrors produced when utilizing ammonia or the various alkyl-substituted ammonias are quite satisfactory. It should also be noted that when employing the latter type of alkaline agents, mirrored surfaces possessing good reflecting properties may be obtained by omitting the use of any additional base other than that required to form the silver ammonia complex.

The nitro alcohols used are broadly defined by the above generic structural formula, specific examples of such compounds being tris(hydroxymethyl)nitromethane, 1,1-bis(hydroxymethyl)-1-nitro-2-propanol, 2-nitro-1,3-propanediol, 2-nitro-2-methyl-1,3-propanediol, 2-nitro-2-ethyl-1,3-propanediol, 2-nitro-2-methyl-1-propanol, 2-nitro-1-propanol, 2-nitro-1-butanol, 2-nitro-3-pentanol, 3-nitro-3-methyl-2-butanol, 2-nitro-4-ethyl-3-pentanol, 2-nitro-2-ethyl-3-hexanol, 3-nitro-4-heptanol, 2-nitro-1-phenyl-1-propanol, 3-nitro-4-decanol, and the like. In connection with the use of the above nitro alcohols, it is frequently desirable to employ a small quantity of a lower aliphatic alcohol, such as ethyl alcohol, in order to obtain a homogeneous silvering solution. This has been found to be particularly true with nitro alcohols of increasing molecular weight.

In carrying out my invention in accordance with the above general description, it will readily occur to those skilled in the art that a mixture of suitable silver salts, as well as a mixture of nitro alcohols and/or bases, may be utilized. In any event, it can readily be determined by way of simple experiment what silver salt and nitro alcohol or combinations thereof should be used in order to effect a satisfactory deposition of silver upon the surface, with which the solution is in contact, to give an even and unpitted reflecting surface.

The examples which follow are typical of both the compositions and procedure employed in carrying out my invention.

*Example I*

Into a suitable vessel was introduced 40 parts of 0.4 molar aqueous silver nitrate solution, approximately 20 parts of 15 molar aqueous ammonia, and 0.4 part of tris(hydroxymethyl)nitromethane. To this resulting aqueous mixture, which consisted principally of diammine-silver nitrate [Ag(NH$_3$)$_2$NO$_3$] and tris(hydroxymethyl)nitromethane was then added at a temperature of about 30° C., with continuous stirring, 10 parts of 2 molar aqueous sodium hydroxide. During the addition of the aqueous sodium hydroxide solution, a bright silver mirror surface was formed upon the walls of the vessel, the mirror attaining its maximum degree of brilliancy shortly after the entire quantity of the sodium hydroxide solution had been added.

*Example II*

A bright silvered reflecting surface was prepared in the same manner as described in Example I, by employing a solution consisting of 1.3 parts of 3-nitro-4-heptanol, 30 parts of ethyl alcohol and 10 parts of 4 molar aqueous ammonia, in place of the tris(hydroxymethyl)nitromethane and 15 molar aqueous ammonia specified in Example I.

*Example III*

A homogeneous solution containing 40 parts of 0.4 molar aqueous silver nitrate, 10 parts of 4 molar aqueous ammonia and 1.2 parts of 2-nitro-2-ethyl-1,3-propanediol was prepared, after which 40 parts of 0.5 molar aqueous barium hydroxide was added thereto, with agitation. During the addition of the barium hydroxide, which was carried out at room temperature, deposition of silver on the walls of the containing vessel was observed. The mirror thus formed reached its maximum state of brilliancy approximately three minutes after the barium hydroxide solution was introduced.

*Example IV*

Forty parts of a 0.4 molar aqueous silver nitrate solution and 0.6 part of 2-nitro-2-ethyl-1,3-propanediol were mixed. To this resulting solution was added 2.4 parts of 2-aminobutane. During the addition of the 2-aminobutane, the mixture was thoroughly agitated and maintained at a temperature of about 29° C. Approximately 15 minutes after all of the 2-aminobutane had been introduced, a bright silver mirror appeared on the vessel walls.

*Example V*

A bright silvered reflecting surface was prepared in the same manner as described in Example IV by employing 2.4 parts of diethylamine instead of the 2-aminobutane specified in Example IV.

*Example VI*

To 40 parts of 0.4 molar aqueous silver nitrate was added 10 parts of 4 molar aqueous ammonia. This mixture was then heated to a temperature of 60° C., after which was added thereto 10 parts of 0.4 molar aqueous 2-nitro-2-ethyl-1,3-propanediol. A brilliant mirror was formed on the vessel walls within a few minutes after the addition of the latter compound.

The silvered reflecting surfaces obtained in accordance with the procedures outlined above may be finished by washing with water and then covered with a suitable coating material, such as clear varnish, shellac, or clear lacquer. Reflecting surfaces of the type described above may be satisfactorily produced upon such materials as glass, copper, nickel, and zinc. Alterations in procedure required to produce satisfactory reflecting surfaces on such materials will be apparent to those familiar with the art. Also other modifications in the reaction conditions and compositions employed will be obvious, and it is intended that such alterations and modifications shall be interpreted as lying within the scope of my invention.

My invention now having been described, what I claim is:

1. A composition capable of producing reflecting surfaces, comprising a silver ammonia complex, a base, and a nitrohydroxy compound having the structural formula:

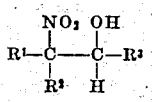

wherein R$^1$ and R$^2$ represent a member selected from the group consisting of hydrogen, hydroxyalkyl, and alkyl, and R$^3$ represents a member selected from the group consisting of hydrogen, aryl, and alkyl.

2. A composition capable of producing a reflecting surface, containing essentially and in reactive proportions, diammine-silver nitrate, sodium hydroxide, and 3-nitro-4-heptanol.

3. A composition capable of producing a reflecting surface, containing essentially and in reactive proportions, diammine-silver nitrate, 2-aminobutane, and 2-nitro-2-ethyl-1,3-propanediol.

4. A composition capable of producing a reflecting surface, containing essentially and in reactive proportions, diammine-silver nitrate, sodium hydroxide, and tris(hydroxymethyl)nitromethane.

5. A method for producing a silvered reflecting surface, comprising reacting a silver ammonia complex, in the presence of a base, with a nitrohydroxy compound of the formula:

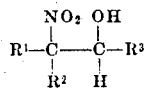

wherein $R^1$ and $R^2$ represent a member selected from the group consisting of hydrogen, hydroxyalkyl, and alkyl, and $R^3$ represents a member selected from the group consisting of hydrogen, aryl, and alkyl, said reaction being effected in the presence of the surface to be silvered.

6. A method for producing a silvered reflecting surface comprising reacting a silver ammonia complex with 3-nitro-4-heptanol, in the presence of sodium hydroxide, said reaction being effected in the presence of the surface to be silvered.

7. A method for producing a silvered reflecting surface comprising reacting a silver ammonia complex with tris(hydroxymethyl)nitromethane in the presence of sodium hydroxide, said reaction being effected in the presence of the surface to be silvered.

8. A method for producing a silvered reflecting surface comprising reacting a silver ammonia complex with 2-nitro-2-ethyl-1,3-propanediol in the presence of 2-aminobutane, said reaction being effected in the presence of the surface to be silvered.

PHILIP F. TRYON.